No. 767,431. PATENTED AUG. 16, 1904.
A. A. PAGE.
HINGE.
APPLICATION FILED APR. 12, 1902.
NO MODEL.
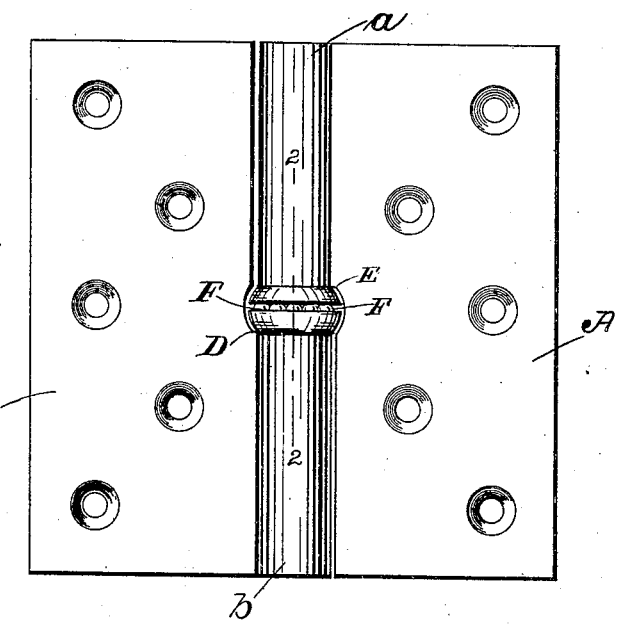
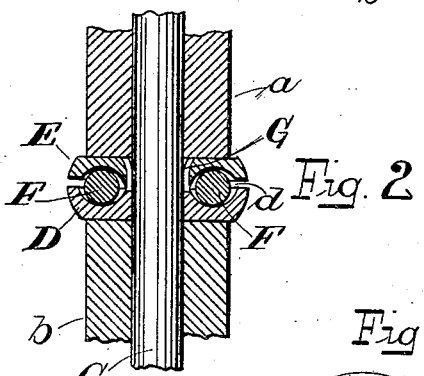
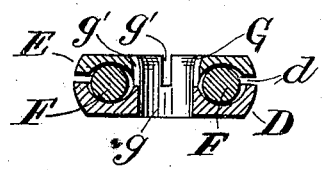
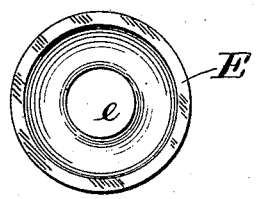
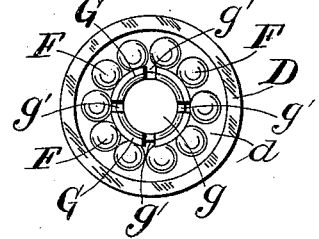
WITNESSES:
J. F. Coleman
William R. Pitkin
INVENTOR
Albert A. Page
BY
Beach & Fisher
ATTORNEYS No. 767,431. Patented August 16, 1904.

UNITED STATES PATENT OFFICE.

ALBERT A. PAGE, OF EAST HAVEN, CONNECTICUT, ASSIGNOR TO SARGENT & COMPANY, OF NEW HAVEN, CONNECTICUT, A CORPORATION OF CONNECTICUT.

HINGE.

SPECIFICATION forming part of Letters Patent No. 767,431, dated August 16, 1904.

Application filed April 12, 1902. Serial No. 102,647. (No model.)

*To all whom it may concern:*

Be it known that I, ALBERT A. PAGE, of the town of East Haven, county of New Haven, State of Connecticut, have invented a new and useful Improvement in Hinges, of which the following is a full, clear, and exact description when taken in connection with the accompanying drawings, which form a part thereof, and in which—

Figure 1 represents a front elevation of a hinge embodying my invention; Fig. 2, a vertical section on lines 2 2 of Fig. 1; Fig. 3, a central vertical section through the washers; Fig. 4, a bottom view of one washer; and Fig. 5, a top view of the other washer, showing the balls therein.

In all figures similar letters of reference represent like parts.

This invention relates to hinges, and more particularly to that class known as "antifriction-hinges," and has for its object the production of a simple and effective antifriction device included in a self-contained structure; and to this end the invention consists in the various improvements and combinations of parts set forth and claimed hereinafter.

Referring to the drawings for a more particular description, the parts designated by the letters A and B represent the two leaves of a hinge, of which *a* and *b* represent the respective knuckles.

C is the pintle of the hinge.

D and E designate two washers adapted to fit between the knuckles *a* and *b*. One of the washers, as D, is provided with an annular groove or recess *d* for a series of balls F. The inner side of the channel is formed by an integral sleeve G, having an axial perforation *g*, adapted to receive the pintle C. The upper end of the sleeve G fits into a circular perforation *e* of the washer E, and the sleeve may be provided with slots *g'* and the upper ends slightly sprung apart, so that when the sleeve fits into the circular perforation *e* (see Figs. 2 and 3) there will be an engagement whereby the two washers will be held together to retain the balls between them, while the washer E is free to rotate on the sleeve. The washers and balls may be removed at will from the hinge on the withdrawal of the pintle, and when so removed they form a single unitary structure, united or held together by the sleeve G.

Having now described my invention, (which may vary in its details somewhat without departing from the spirit of the invention,) what I claim, and desire to secure by Letters Patent, is—

1. An antifriction device for hinges, or similar articles, consisting of a pair of washers, one of which is provided with a channel, the inner side of said channel being formed by a hollow sleeve integral with one of said washers, said sleeve being flared to extend into and engage with the other washer while permitting it free rotary movement; and a series of balls in said channel, substantially as described.

2. The combination with a hinge; of a pintle; a pair of washers adapted to fit between the knuckles of said hinge; one of said washers having an annular channel; a hollow sleeve integral with one of said washers and extending into and engaging the other washer from lateral movement while permitting the same independent rotary movement, and balls in said channel between said washers, whereby said washers and balls are held together when removed from said hinge, and are adapted to be held in place in said hinge by the pintle extending through said sleeve, substantially as described.

In witness whereof I have hereunto set my hand on the 8th day of April, 1902.

ALBERT A. PAGE.

Witnesses:
ANNA L. KILLOY,
NELLIE M. WEDMORE.